United States Patent
Gu

(10) Patent No.: US 9,884,643 B2
(45) Date of Patent: Feb. 6, 2018

(54) FRICTION COMPENSATION CONTROL APPARATUS AND METHOD OF MDPS SYSTEM

(71) Applicant: HYUNDAI MOBIS CO., LTD., Seoul (KR)

(72) Inventor: Eun Kyung Gu, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 191 days.

(21) Appl. No.: 14/796,947

(22) Filed: Jul. 10, 2015

(65) Prior Publication Data

US 2016/0059884 A1    Mar. 3, 2016

(30) Foreign Application Priority Data

Sep. 2, 2014 (KR) ........................ 10-2014-0115992

(51) Int. Cl.
*B62D 6/00* (2006.01)
*B62D 6/08* (2006.01)
*B62D 5/04* (2006.01)

(52) U.S. Cl.
CPC ......... *B62D 5/0463* (2013.01); *B62D 5/0466* (2013.01)

(58) Field of Classification Search
None
See application file for complete search history.

(56) References Cited

U.S. PATENT DOCUMENTS

| | | | | |
|---|---|---|---|---|
| 5,740,040 A * | 4/1998 | Kifuku | ................. | B62D 5/0463 180/446 |
| 6,450,287 B1 * | 9/2002 | Kurishige | ............ | B62D 5/0466 180/443 |
| 7,523,806 B2 * | 4/2009 | Krieger | ................ | B62D 5/0472 180/443 |
| 8,423,245 B2 * | 4/2013 | Kimura | ................ | B62D 5/0472 701/1 |
| 8,612,094 B2 * | 12/2013 | Champagne | ......... | B62D 5/0472 180/443 |
| 9,150,244 B2 * | 10/2015 | Klein | .................... | B62D 5/0481 |
| 2002/0026267 A1 * | 2/2002 | Kifuku | ................. | B62D 5/0466 701/41 |
| 2002/0060538 A1 * | 5/2002 | Hara | .................... | B62D 5/0466 318/432 |
| 2002/0116105 A1 * | 8/2002 | Chen | .................... | B62D 5/0463 701/41 |

(Continued)

FOREIGN PATENT DOCUMENTS

KR    10-2013-0139081 A    12/2013

OTHER PUBLICATIONS

Machine Translation of Korean Publication 20130139081, published Dec. 20, 2013.*

*Primary Examiner* — Navid Ziaeianmehdizadeh
(74) *Attorney, Agent, or Firm* — Knobbe Martens Olson & Bear LLP

(57) ABSTRACT

A friction compensation control apparatus of a motor driven power steering (MDPS) system may include: a damping control unit configured to detect a damping torque of the MDPS system; and a friction compensation control module configured to detect a friction compensation torque using a column torque, a motor speed, and a vehicle speed, and adjust the detected friction compensation torque according to the magnitude of the damping torque.

8 Claims, 4 Drawing Sheets

(56) References Cited

U.S. PATENT DOCUMENTS

| | | | | |
|---|---|---|---|---|
| 2003/0074120 A1* | 4/2003 | Kleinau | B62D | 5/0463 |
| | | | | 701/41 |
| 2006/0069481 A1* | 3/2006 | Kubota | B62D | 5/0463 |
| | | | | 701/41 |
| 2006/0076916 A1* | 4/2006 | Heilig | B62D | 5/0463 |
| | | | | 318/437 |
| 2007/0265751 A1* | 11/2007 | Tsuchiya | B62D | 5/0463 |
| | | | | 701/41 |
| 2008/0189014 A1* | 8/2008 | Tanaka | B62D | 5/0466 |
| | | | | 701/42 |
| 2009/0055049 A1* | 2/2009 | Sakaguchi | B62D | 5/0463 |
| | | | | 701/41 |
| 2010/0168963 A1* | 7/2010 | Yamamoto | B62D | 5/0463 |
| | | | | 701/42 |
| 2010/0268421 A1* | 10/2010 | Yang | B62D | 5/0466 |
| | | | | 701/41 |
| 2012/0209475 A1* | 8/2012 | Birsching | B62D | 5/0463 |
| | | | | 701/42 |
| 2012/0232759 A1* | 9/2012 | Oniwa | B62D | 5/0463 |
| | | | | 701/41 |
| 2013/0261894 A1* | 10/2013 | Kojima | B62D | 5/0463 |
| | | | | 701/41 |
| 2015/0046040 A1* | 2/2015 | Ahn | B62D | 5/0463 |
| | | | | 701/42 |
| 2015/0066299 A1* | 3/2015 | Jang | B62D | 5/0463 |
| | | | | 701/41 |
| 2015/0066306 A1* | 3/2015 | Kodera | B62D | 5/0466 |
| | | | | 701/43 |
| 2015/0112551 A1* | 4/2015 | MacLaughlin | B62D | 5/0463 |
| | | | | 701/41 |

* cited by examiner

FRICTION COMPENSATION CONTROL APPARATUS AND METHOD OF MDPS SYSTEM

CROSS-REFERENCES TO RELATED APPLICATIONS

The present application claims priority to Korean application number 10-2014-0115992, filed on Sep. 2, 2014, which is incorporated by reference in its entirety.

BACKGROUND

The present disclosure relates to a friction compensation control apparatus and method of a motor driven power steering (MDPS) system.

The MDPS system controls a motor to apply light and comfortable steering feeling during low-speed operation of a vehicle, and controls the motor to apply heavy and safe steering feeling during high-speed operation of the vehicle. During an emergency situation, the MDPS system controls the motor to rapidly perform steering, thereby providing an optimal steering environment to a driver.

The related technology is disclosed in Korean Patent Laid-open Publication No. 10-2013-0139081 published on Dec. 20, 2013.

SUMMARY

Embodiments of the present invention are directed to a friction compensation control apparatus and method of an MDPS system, which adjusts a friction compensation torque according to a damping torque in a middle/high-speed region, thereby improving damping control performance.

Also, embodiments of the present invention are directed to a friction compensation control apparatus and method of an MDPS system, which performs friction compensation control at a friction compensation period and performs damping control at a damping control period, thereby securing on-center steering feeling, vehicle recoverability, torque build-up, and hand-free stability.

In one embodiment, a friction compensation control apparatus of an MDPS system may include: a damping control unit configured to detect a damping torque of the MDPS system; and a friction compensation control module configured to detect a friction compensation torque using a column torque, a motor speed, and a vehicle speed, and adjust the detected friction compensation torque according to the magnitude of the damping torque.

The friction compensation control module may include: a friction compensation torque detection unit configured to detect a friction compensation torque using a column torque and a steering angle; and a gain adjusting unit configured to adjust a gain of the friction compensation torque detected through the friction compensation torque detection unit according to the damping torque, and decouple a damping control period from a friction compensation period.

When the damping torque is equal to or more than a preset value, the friction compensation control module may decrease the gain of the friction compensation torque according to the damping torque.

The friction compensation control module may decrease the friction compensation torque in proportion to the damping torque when the damping torque increases, and increase the decreased friction compensation torque in proportion to the damping torque when the damping torque decreases after reaching the maximum value.

The friction compensation control apparatus may further include: a torque control unit configured to output a torque command by reflecting a gear ratio of an MDPS motor into a steering torque detected through a torque sensor; an active restoration control unit configured to detect a restoration torque based on a steering angle sensed through a steering angle sensor, and output the detected restoration torque; and a torque command output unit configured to generate an MDPS motor torque command using one or more of the torque command provided from the torque control unit, the damping torque provided from the damping control unit, the restoration torque provided from the active restoration control unit, and the friction compensation torque provided from the friction compensation control module, and output the generated MDPS motor torque to the MDPS motor.

In another embodiment, a friction compensation control method of an MDPS system may include: detecting a damping torque of the MDPS system; detecting a friction compensation torque using a column torque, a motor speed, and a vehicle speed; and adjusting the detected friction compensation torque according to the magnitude of the damping torque.

The adjusting of the detected friction compensation torque may include decoupling a damping control period from a friction compensation period by adjusting a gain of the friction compensation torque according to the damping torque.

The adjusting of the detected friction compensation torque may include decreasing the gain of the friction compensation torque according to the damping torque when the damping torque is equal to or more than a preset value.

The adjusting of the detected friction compensation torque may include decreasing the friction compensation torque in proportion to the damping torque when the damping torque increases, and increasing the decreased friction compensation torque in proportion to the damping torque when the damping torque decreases after reaching the maximum value.

The friction compensation control method may further include generating an MDPS motor torque command using one or more of a torque command provided from a torque control unit, the damping torque, a restoration torque provided from an active restoration control unit, and the friction compensation torque, and outputting the generated MDPS motor toque to an MDPS motor.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

When an MDPS system controls the motor to perform power steering, compensation for friction is properly performed to improve the operation performance of the vehicle. The friction of the vehicle may be divided into friction of the MDPS system, friction of a steering gear box, friction of a steering system, and friction of a tire.

From the view point of the MDPS system, it is important to compensate for the friction of the MDPS system. However, the friction of the vehicle is also compensated for in order to improve the operation performance of the vehicle. When the vehicle straightly travels at a predetermined speed or more, the zero point of a steering torque coincides with the zero point of a steering angle.

In a middle/high-speed region, a friction compensation torque and a damping control torque may overlap each other to degrade the damping control performance. As a result, on-center steering feeling, vehicle recoverability, torque build-up, and hand-free stability may be degraded.

Figure 1:
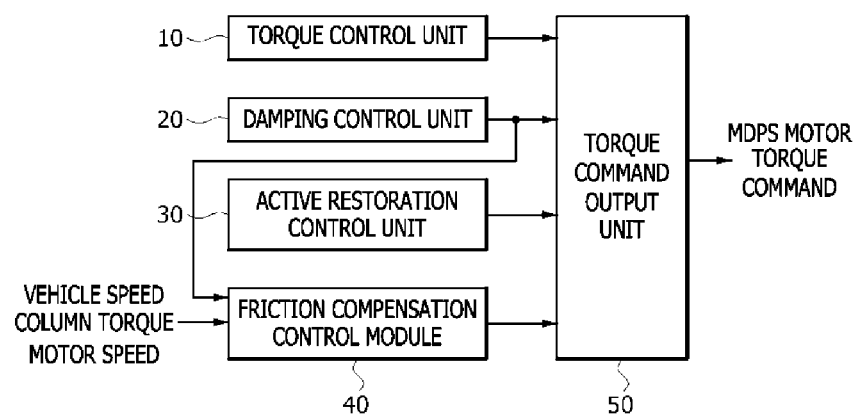
FIG. 1 is a block configuration diagram of an MDPS system in accordance with an embodiment of the present invention.
Figure 2:
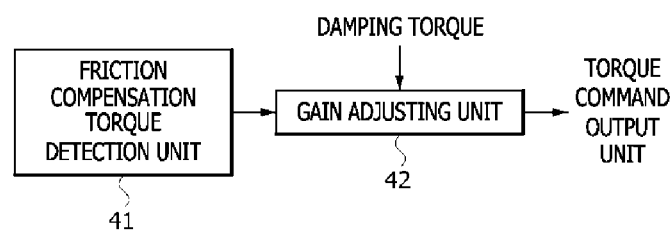
FIG. 2 is a block configuration diagram of a friction compensation control apparatus of the MDPS in accordance with the embodiment of the present invention.
Figure 3:
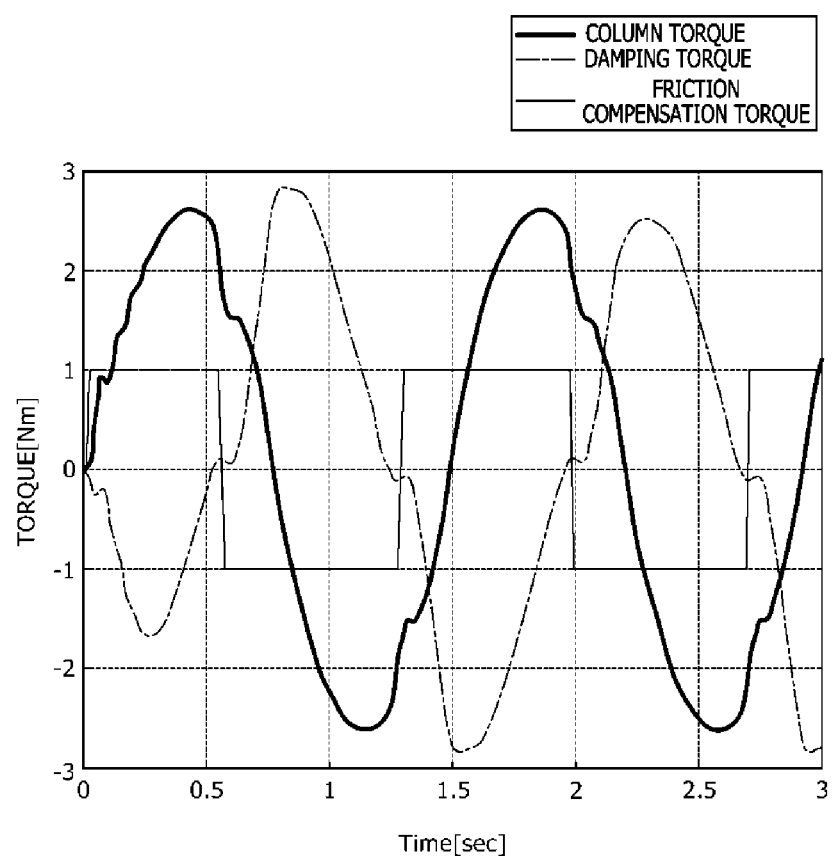
FIG. 3 is a diagram illustrating the changes of torques in a typical MDPS system.
Figure 4:
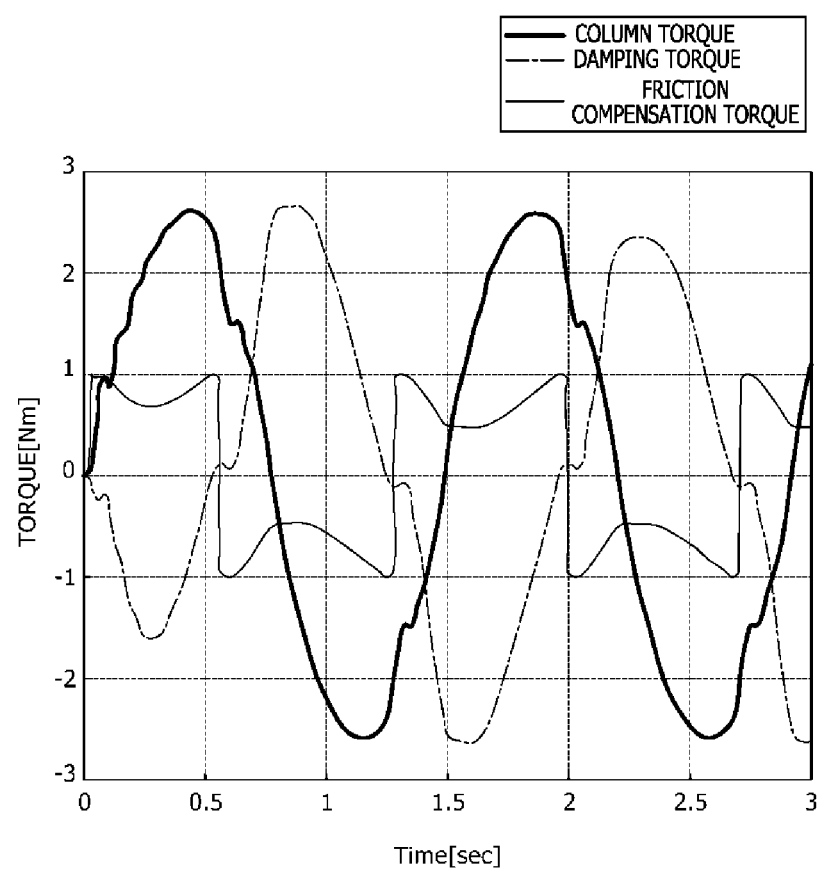
FIG. 4 is a diagram illustrating the changes of torques in the MDPS system in accordance with the embodiment of the present invention.

FIG. 1 is a block configuration diagram of an MDPS system in accordance with an embodiment of the present invention. FIG. 2 is a block configuration diagram of a friction compensation control apparatus of the MDPS in accordance with the embodiment of the present invention. FIG. 3 is a diagram illustrating the changes of torques in a typical MDPS system. FIG. 4 is a diagram illustrating the changes of torques in the MDPS system in accordance with the embodiment of the present invention.

Referring to FIG. 1, the MDPS system for a vehicle in accordance with the embodiment of the present invention may include a torque control unit 10, a damping control unit 20, an active restoration control unit 30, a friction compensation control module 40, and a torque command output unit 50.

Output values of the torque control unit 10, the damping control unit 20, and the active restoration control unit 30 may be combined in parallel by the torque command output unit 50, and used to output a torque command of an MDPS motor through the torque command output unit 50.

The torque control unit 10 may reflect a gear ratio of the MDPS motor into a steering torque sensed through a torque sensor of a steering wheel, and detect a steering torque command.

The damping control unit 20 may detect a damping torque through the steering direction and steering angle of the vehicle, sensed through a steering angle sensor, a vehicle speed sensed through a vehicle speed sensor, and a steering torque sensed through a steering sensor.

The active restoration control unit 30 may detect a restoration torque based on the steering angle sensed through the steering angle sensor.

For reference, the torque control unit 10, the damping control unit 20, and the active restoration control unit 30 may not be limited to the above-described embodiment, but configured through a publicly known algorithm. In this case, the algorithm is not necessarily limited to a specific algorithm. Therefore, the torque control unit 10, the damping control unit 20, and the active restoration control unit 30 may be employed in various manners by those skilled in the art.

The friction compensation control module 40 may adjust a friction compensation torque using the damping torque outputted from the damping control unit 20. Through this operation, the friction compensation control module 40 may prevent the degradation of the damping control performance, which may occur when a friction compensation control period and a damping control section overlap each other in a middle/high-speed region.

Referring to FIG. 2, the friction compensation control module 40 may include a friction compensation torque detection unit 41 and a gain adjusting unit 42.

The friction compensation torque detection unit 41 may detect a friction compensation torque using a column torque, a motor speed, and a vehicle speed.

In this case, the friction compensation torque detection unit 41 may calculate a steering torque caused by a backlash between a tire and a mechanical part of the vehicle and a phase difference of the steering angle, using the column torque, the steering angle, the vehicle speed, and the speed of the MDPS motor. The column torque and the steering angle may be detected through the torque sensor and the steering angle sensor.

The friction compensation torque detection unit 41 may add the phase difference of the steering angle to the steering angle and calculate a compensation steering angle of which the phase is compensated for. Then, the friction compensation torque detection unit 41 may detect a friction compensation torque mapped to the calculated compensation steering angle from a friction compensation map. The friction compensation map may be previously mapped through an experiment depending on a vehicle.

The friction compensation torque detection unit 41 may not be limited to the above-described embodiment, but configured through a publicly known algorithm. The algorithm is not necessarily limited to a specific algorithm. Thus, the friction compensation torque detection unit 41 may be employed in various manners by those skilled in the art.

The friction compensation torque detection unit 41 may input the detected friction compensation torque to the gain adjusting unit 42.

The gain adjusting unit 42 may adjust the gain of the friction compensation torque detected through the friction compensation torque detection unit 41 according to the damping torque received from the damping control unit 20. That is, the gain adjusting unit 42 may receive the friction compensation torque and the damping torque from the friction compensation torque detection unit 41 and the damping control unit 20, respectively, and decouple a damping control period from a friction compensation period by adjusting the friction compensation torque according to the damping torque. In this case, the gain adjusting unit 42 may reduce the friction compensation torque by tuning the gain of the friction compensation torque to 1 according to the damping torque at a period in which the damping torque is equal to or more than a preset value. The gain adjusting unit 42 may decrease the friction compensation torque in proportion to the damping torque when the damping torque increases, and increase the decreased friction compensation torque in proportion to the damping torque when the damping torque decreases after reaching the maximum value. The preset value may indicate a friction compensation torque having a magnitude at which damping performance can be degraded by the friction compensation torque.

That is, the gain adjusting unit 42 may adjust the friction compensation torque using a decoupling gain according to the damping torque, thereby preventing the degradation of the damping performance by the friction compensation torque.

FIG. 3 is a diagram illustrating a friction compensation torque of a typical MDPS system. Referring to FIG. 3, the direction of the friction compensation torque of this MDPS system is set to the opposite direction of a damping torque. In this case, the damping control performance may be degraded by the friction compensation torque.

FIG. 4 is a diagram illustrating a friction compensation torque of the MDPS system in accordance with the embodiment of the present invention. Referring to FIG. 4, the friction compensation torque adjusted by the friction compensation control module 40 has a smaller value than the friction compensation torque of the typical MDPS system, while the direction thereof is set to the opposite direction of a damping torque. Thus, the MDPS system can prevent the degradation of the damping performance by the friction compensation torque.

The gain adjusting unit 42 may input the adjusted friction compensation torque to the torque command output unit 50.

In this case, the torque command output unit 50 may detect an MDPS motor torque command using any one of the torque command of the torque control unit 10, the damping torque of the damping control unit 20, the restoration torque of the active restoration control unit 30, and the friction compensation torque of the friction compensation control module 40, and input the detected MDPS motor torque command to the MDPS motor.

The MDPS motor may be operated to generate a proper auxiliary torque according to the MDPS motor torque command inputted from the torque command output unit 50, thereby providing an optimal steering environment to a driver.

Hereafter, a friction compensation control method in accordance with an embodiment of the present invention will be described in detail with reference to FIG. 5.

Figure 5:
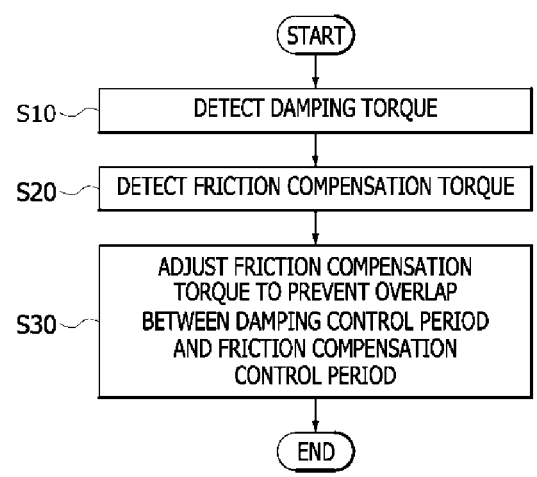
FIG. 5 is a flowchart illustrating a friction compensation control method of an MDPS system in accordance with an embodiment of the present invention.

FIG. 5 is a flowchart illustrating a friction compensation control method of an MDPS system in accordance with an embodiment of the present invention.

Referring to FIG. 5, the torque control unit 10 may detect a torque command by reflecting a gear ratio of the MDPS motor using a steering torque detected through the torque sensor of the steering wheel, and input the detected torque command to the torque command output unit 50.

The active restoration control unit 30 may detect a restoration torque based on the steering angle sensed through the steering angle sensor, and input the detected restoration torque to the torque command output unit 50.

In particular, the damping control unit 20 may detect a damping torque through the steering direction and steering angle of the steering wheel, a vehicle speed, and the steering torque at step S10, and input the detected damping torque to the torque command output unit 50 and the friction compensation control module 40.

Then, the friction compensation torque detection unit 41 of the friction compensation control module 40 may detect a friction compensation torque using a column torque, a motor speed, and the vehicle speed at step S20.

In this case, the friction compensation torque detection unit 41 may calculate a steering torque caused by a backlash between a tire and a mechanical part of the vehicle and a phase difference of the steering angle, using the column torque, the steering angle, the vehicle speed, and the speed of the MDPS motor, add the phase difference to the steering angle so as to calculate a compensation steering angle of which the phase is compensated for, detect a friction compensation torque mapped to the calculate compensation steering angle from the friction compensation map, and input the detected friction compensation torque to the gain adjusting unit 42.

Therefore, the gain adjusting unit 42 of the friction compensation control module 40 may adjust the gain of the friction compensation torque according to the damping torque received from the damping control unit 20 at step S30. In this case, the gain adjusting unit 42 may reduce the friction compensation torque in order to prevent an overlap between the damping control period and the friction compensation control period. When the damping torque increases as illustrated in FIG. 4, the gain adjusting unit 42 may decrease the friction compensation torque in proportion to the damping torque. Then, when the damping torque decreases after reaching the maximum value, the gain adjusting unit 42 may increase the decreased friction compensation torque in proportion to the damping torque.

Then, the gain adjusting unit 42 may input the adjusted friction compensation torque to the torque command output unit 50.

As the torque command of the torque control unit 10, the damping torque of the damping control unit 20, the restoration torque of the active restoration control unit 30, and the friction compensation torque limited by the damping torque are inputted, the torque command output unit 50 may detect an MDPS motor torque command using one or more of the torque command of the torque control unit 10, the damping torque of the damping control unit 20, the restoration torque of the active restoration control unit 30, and the friction compensation torque of the friction compensation control module 40.

Then, the torque command output unit 50 may input the detected MDPS motor torque command to the MDPS motor, and the MDPS motor may be operated according to the MDPS motor torque command inputted from the torque command output unit 50.

In accordance with the embodiments of the present invention, the friction compensation control apparatus and method can improve the damping control performance by adjusting a friction compensation torque according to a damping torque in a middle/high-speed region, and secure on-center steering feeling, vehicle recoverability, torque build-up, and hand-free stability.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A friction compensation control apparatus of a motor driven power steering (MDPS) system, comprising:
   a damping control unit configured to detect a damping torque of the MDPS system; and
   a friction compensation control module configured to detect a friction compensation torque using a column torque, a motor speed, and a vehicle speed, and adjust the detected friction compensation torque according to the magnitude of the damping torque,
   wherein the friction compensation control module comprises:
      a friction compensation torque detection unit configured to detect a friction compensation torque using a column torque and a steering angle; and
      a gain adjusting unit configured to adjust a gain of the friction compensation torque detected through the friction compensation torque detection unit according to the damping torque, and decouple a damping control period from a friction compensation period.

2. The friction compensation control apparatus of claim 1, wherein when the damping torque is equal to or more than a preset value, the friction compensation control module decreases the gain of the friction compensation torque according to the damping torque.

3. The friction compensation control apparatus of claim 1, wherein the friction compensation control module decreases the friction compensation torque in proportion to the damping torque when the damping torque increases, and increases the decreased friction compensation torque in proportion to the damping torque when the damping torque decreases after reaching the maximum value.

4. The friction compensation control apparatus of claim 1, further comprising:
   a torque control unit configured to output a torque command by reflecting a gear ratio of an MDPS motor into a steering torque detected through a torque sensor;
   an active restoration control unit configured to detect a restoration torque based on a steering angle sensed through a steering angle sensor, and output the detected restoration torque; and
   a torque command output unit configured to generate an MDPS motor torque command using one or more of the torque command provided from the torque control unit, the damping torque provided from the damping control unit, the restoration torque provided from the active restoration control unit, and the friction compensation torque provided from the friction compensation control module, and output the generated MDPS motor torque to the MDPS motor.

5. A friction compensation control method of an MDPS system, comprising:
   detecting a damping torque of the MDPS system;
   detecting a friction compensation torque using a column torque, a motor speed, and a vehicle speed; and
   adjusting the detected friction compensation torque according to the magnitude of the damping torque,
   wherein the adjusting of the detected friction compensation torque comprises decoupling a damping control period from a friction compensation period by adjusting a gain of the friction compensation torque according to the damping torque.

6. A friction compensation control method of a motor driven power steering (MDPS) system the method comprising:
   detecting a damping torque of the MDPS system;
   detecting a friction compensation torque using a column torque, a motor speed, and a vehicle speed; and
   adjusting the detected friction compensation torque according to the magnitude of the damping torque,
   wherein the adjusting of the detected friction compensation torque comprises decreasing a gain of the friction compensation torque according to the damping torque when the damping torque is equal to or more than a preset value.

7. The method of claim 6, wherein the adjusting of the detected friction compensation torque comprises decreasing the friction compensation torque in proportion to the damping torque when the damping torque increases, and increasing the decreased friction compensation torque in proportion to the damping torque when the damping torque decreases after reaching the maximum value.

8. The method of claim 6, further comprising generating an MDPS motor torque command using one or more of a torque command provided from a torque control unit, the damping torque, a restoration torque provided from an active restoration control unit, and the friction compensation torque, and outputting the generated MDPS motor toque to an MDPS motor.

* * * * *